United States Patent [19]

Cole

[11] Patent Number: 5,128,900

[45] Date of Patent: * Jul. 7, 1992

[54] MULTI-COMPONENT SEISMIC VIBRATORY SOURCE FOR USE IN MARINE ENVIRONMENTS

[75] Inventor: Jack H. Cole, Ponca City, Okla.

[73] Assignee: Conoco Inc., Ponca City, Okla.

[ * ] Notice: The portion of the term of this patent subsequent to Jul. 7, 2009 has been disclaimed.

[21] Appl. No.: 712,172

[22] Filed: Jun. 6, 1991

[51] Int. Cl.⁵ .............................................. G01V 1/00
[52] U.S. Cl. ...................................... 367/75; 367/143; 367/173; 181/110; 181/114; 181/121
[58] Field of Search ................. 367/75, 143, 173, 189; 181/110, 113, 114, 121, 401; 175/1, 5, 2, 6, 8, 9, 10, 86, 19; 166/352, 353, 354, 355, 356

[56] References Cited

U.S. PATENT DOCUMENTS

| | | | |
|---|---|---|---|
| 3,365,019 | 1/1968 | Bays | 181/120 |
| 3,394,775 | 7/1968 | Cole et al. | 181/120 |
| 3,781,775 | 12/1973 | Malloy et al. | 367/104 |
| 3,810,524 | 5/1974 | Dransfield | 181/119 |
| 4,014,403 | 3/1977 | Mifsud | 181/114 |
| 4,336,843 | 6/1982 | Petty | 166/362 |
| 4,516,227 | 5/1985 | Wener et al. | 367/15 |
| 4,558,437 | 12/1985 | Meeder et al. | 367/15 |
| 4,730,692 | 3/1988 | Fair et al. | 181/114 |
| 4,766,574 | 8/1988 | Whitmore, Jr. et al. | 367/50 |
| 4,871,045 | 10/1989 | Cole | 181/114 |

Primary Examiner—J. W. Eldred

[57] ABSTRACT

The method and apparatus for providing elliptical polarized shear waves in a marine environment in which a shear wave source penetrates the surface sediment of a water bottom includes dual actuator/reaction mass system mounted inside a structural ring of a conical housing section. A cross shaped structure at the top of the apparatus serves as a passive reaction mass and as a moment arm support for reversibly motor driven propellers enclosed in shrouds at the outer ends of the cross shaped structure. A thruster system provides dynamic positioning. The cross shaped structure and housing section are connected by a structurally stiff member, such as a vertical tube. Pistons provide actuation of two reaction masses located within the housing structure, and the motions of the reaction masses generate shear waves which propagate in the subsurface formations.

17 Claims, 5 Drawing Sheets

MULTI-COMPONENT SEISMIC VIBRATORY SOURCE FOR USE IN MARINE ENVIRONMENTS

BACKGROUND OF THE INVENTION

1. Field of the Invention

The present invention relates to methods and apparatus for generating seismic waves and more particularly to apparatus for generating elliptical polarized seismic shear waves in a marine environment.

2. Related Prior Art

Prior art includes several methods for generating seismic waves in a marine or subsea environment. United States patents that are representative of the state of the art illustrating devices for the generation of seismic waves in marine environments are U.S. Pat. Nos. 3,365,019, (Bays) 3,394,775, (Cole, et al.), 4,014,403, (Mifsud) and 4,516,227, (Wener, et al.).

U.S. Pat. No. 3,365,019, "Seismic Vibrator for Marshlands and Submarine Use", (Bays), relates to a vibrator for marshlands use, having a cup shaped earth coupling member oriented for contacting the earth at its open end, and having a reaction mass member mounted to the coupling member. A suction device is provided for coupling the vibrator to the earth and a pressure device for releasing the coupling member.

U.S. Pat. No. 3,394,775, "Marine Vibration Transducer", (Cole, et al.), relates to a pressure-compensated acoustical wave generator having a device for slidable sealing a piston to a support member, and a flexible seal. The flexible seal is secured at one end to the outer periphery of the support member and at the other end to the outer periphery of a portion of the piston.

U.S. Pat. No. 4,014,403, "Vibratory Apparatus for Use in Seismic Exploration", (Mifsud), relates to a variable frequency seismic vibrator, including an earth coupling plate, a reaction impedance generator, and an energy source for generating reciprocating movement of the coupling plate relative to the reaction impedance. The reaction impedance is generated by a reaction mass and a spring of variable stiffness which couples the reaction mass to the vibrator. As the frequency of vibration changes, the stiffness of the spring is automatically adjusted so that the impedance of the spring resonates with the impedance of the mass to maximize the reaction impedance.

U.S. Pat. No. 4,516,227, "Subocean Bottom Explosive Seismic System", (Wener, et al.), relates to a system which provides at least one subocean bottom seismic device, such as a seismic source or a seismic detector, and a planting unit. When the planting unit is lowered, it selectively implants the seismic device at predetermined locations in the ocean bottom, it releases from the implanted seismic device, and uncoils a signal cable from the implanted seismic device when it is raised. The signal cable, which is capable of retrieving the implanted seismic device, is connected to an anchored buoy which contains a first communications unit. A second seismic device is carried in a predetermined pattern near the implanted seismic device and is connected to a second communication unit.

Prior art patents that relate to methods for acquisition of seismic data in a marine environment are represented by U.S. Pat. Nos. 3,781,775, (Malloy), 3,810,524, (Dransfield), 4,558,437, (Meeder, et al.) and 4,766,574, (Whitmore Jr. et al.).

U.S. Pat. No. 3,781,775, "Rotating Stereo Sonar Mapping and Positioning System", (Malloy), relates to a stereo sonar system including a pair of pulsed sonar transducers mounted one above the other on a stationary bottom frame. The transducers are rotated as a unit, but are spaced sufficiently to produce a three dimensional figure when stereo viewed.

U.S. Pat. No. 3,810,524, "Apparatus for Carrying a Seismic Energy Generator", (Dransfield), relates to an apparatus for carrying a seismic energy generator, which includes a frame and a carriage movable with respect to each other. The frame and carriage are interconnected by a unidirectional dashpot which allows the carriage upon which the generator is mounted to move freely upwardly, and constrains it from moving rapidly downwardly. In one embodiment, the dashpot includes a piston, with holes contained within a hydraulic cylinder and a plate mounted adjacent to the cylinder. Also included is a spring biased away from the piston to cover the holes when the bias is overcome by hydraulic fluid pressure. This is done to restrict the fluid flow and movement of the carriage in one direction.

U.S. Pat. No. 4,558,437, "Seafloor Velocity and Amplitude Measurement Apparatus and Method Therefor", (Meeder, et al.), relates to a system which provides a method and apparatus for measuring the velocity and amplitude of sound waves from acoustic pulses generated near the mud line of the seafloor. The apparatus includes a seismic source for generating the acoustic pulses, one or a plurality of vertically spaced sensors located vertically below the seismic source for sensing when the sound waves impact the sensors and a hydrophone sensor located on the vessel for measuring the distance to the seismic source. Also included are a crane and winch for pulling the embedded sensors upwardly and out from the sediments, and a device for firing the seismic source when said sensors are being pulled upwardly. Devices for taking amplitude and velocity measurements from each sensor and for determining the distance the sensors have been pulled upwardly for each acoustical pulse operation are included.

U.S. Pat. No. 4,766,574, "Method for Depth Imaging Multicomponent Seismic Data", (Whitmore Jr. et al.), relates to a method for imaging multicomponent seismic data to obtain depth images of the earth's subsurface geological structure as well as estimates of compressional and shear wave interval velocities. Measures are obtained of imparted seismic wavefields incident on reflecting interfaces in the earth's subsurface and of scattered seismic wavefields that result from wavefields incident on the interfaces. The incident and scattered seismic wavefields are employed to produce time dependent reflectivity functions representative of the reflecting interfaces. By migrating the time dependent reflectivity functions, depth images of the reflecting interfaces can be obtained. For a dyadic set of multicomponent seismic data, the dyadic set of multicomponent seismic data are partitioned so as to separate the variously coupled incident and reflected wavefields in the recorded multicomponent seismic data. The incident and reflected wavefields are cross correlated to form time dependent reflectivity functions. The time dependent reflectivity functions are then iteratively migrated according to a model of wavefield velocities of propagation to obtain estimates of the compressional and shear wave interval velocity. The migrated reflectivity functions can then be stacked to produce depth images of the earth's subsurface geological structures.

SUMMARY OF THE INVENTION

The present invention provides a method and apparatus for providing elliptical shear wave in a marine environment in which a shear wave source penetrates the surface sediment of a water bottom. The shear wave generating source includes a dual actuator/reaction mass system mounted inside a structural ring of a housing section. A cross shaped structure at the top of the apparatus serves as a passive reaction mass and as a moment arm support for reversibly motor driven propellers enclosed in shrouds at the outer ends of the cross shaped structure. A thruster system provides dynamic positioning. The cross shaped structure and housing section are connected by a structurally stiff member, such as a vertical tube. Pistons provide actuation of each of two reaction masses located within the housing structure, and the combined motion of the two reaction masses generates shear waves which propagate in the subsurface formations. In one embodiment, two reaction masses are stacked one on top of the other and actuated with a ninety degree phase difference. In a second embodiment, a dual cylinder actuated reaction mass is sandwiched between two single cylinder actuated reaction masses. In a third embodiment, a cylindrical reaction mass is actuated by four actuation piston and cylinder arrangements.

DESCRIPTION OF THE PREFERRED EMBODIMENT

The objective of this invention is to provide a means for simultaneously generating multicomponent (compression, vertical shear, and horizontal shear) vibratory seismic waves in marshes, marine environments (including deep water) with soft sediment bottoms, and soft surface areas where conventional vibratory sources cannot effectively couple to the earth.

The present invention permits multicomponent seismic surveys and vertical seismic profile surveys (VSPs) to be used in areas where petroleum resources are now considered to be most likely located.

The present invention provides a method and apparatus that allows the direct generation of seismic vibratory shear waves in marshes, marine environments with soft sediment bottoms, and in soft surface areas where shear wave VIBROSEIS systems cannot effectively couple to the earth.

Figures 1, 2:
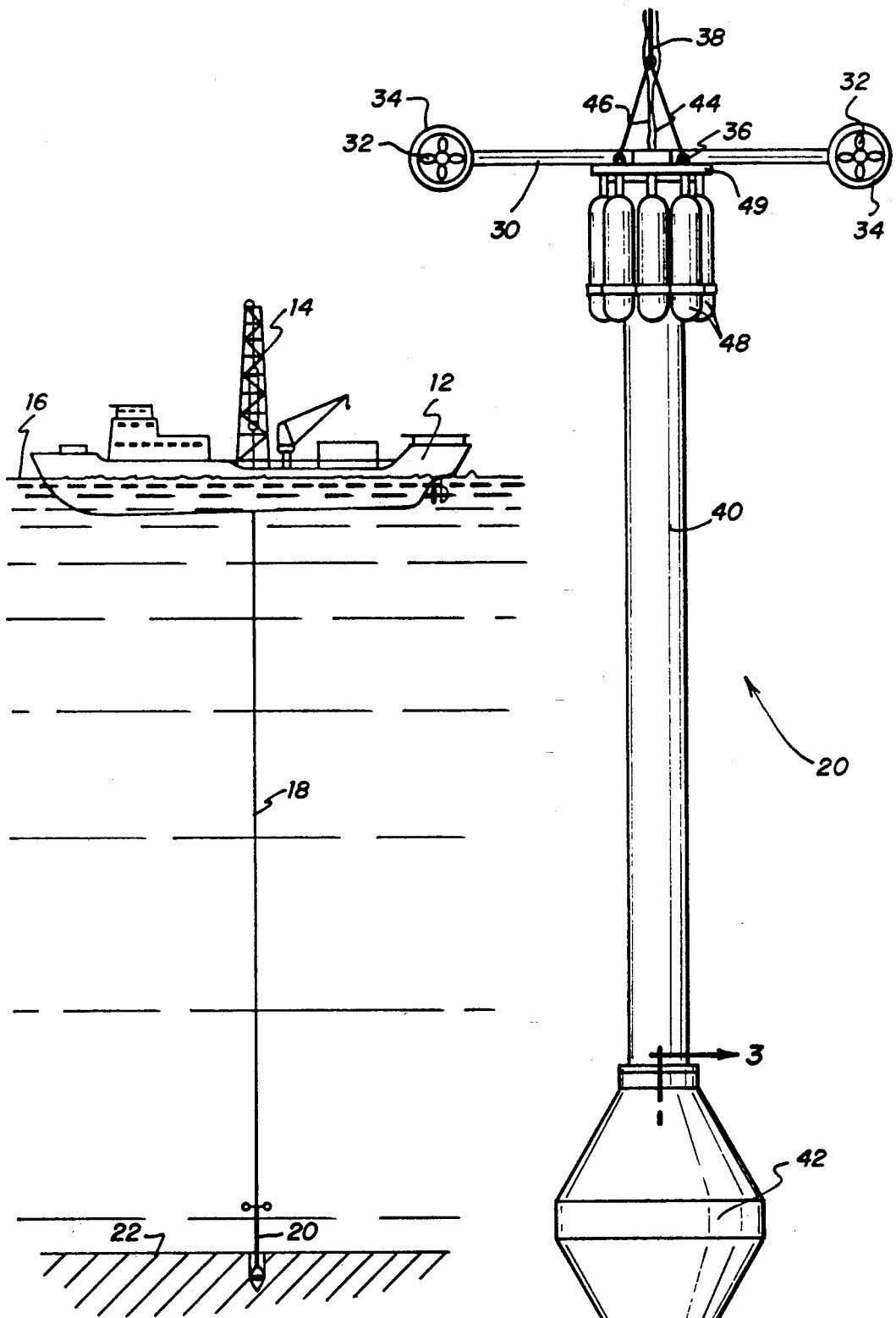
FIG. 1 is a plan view of an implementation system for an on bottom seismic shear wave source.
FIG. 2 is a sectional view of a deep penetrating shear wave seismic vibratory source.

An envisioned implementation of the present invention is illustrated in FIG. 1. A drill ship, barge, or other dynamically positioned surface vessel 12 containing a draw works 14 is located at the water surface 16. An umbilical 18, consisting of a tension strength member, power conductor(s), and signal transmission cable (see FIG. 2) extends from draw works 14 downward to a vibratory seismic source 20, which is shown penetrating the water bottom sediment 22. Source 20 is conceptually illustrated in greater detail in FIG. 3 through FIG. 8.

Figure 3:
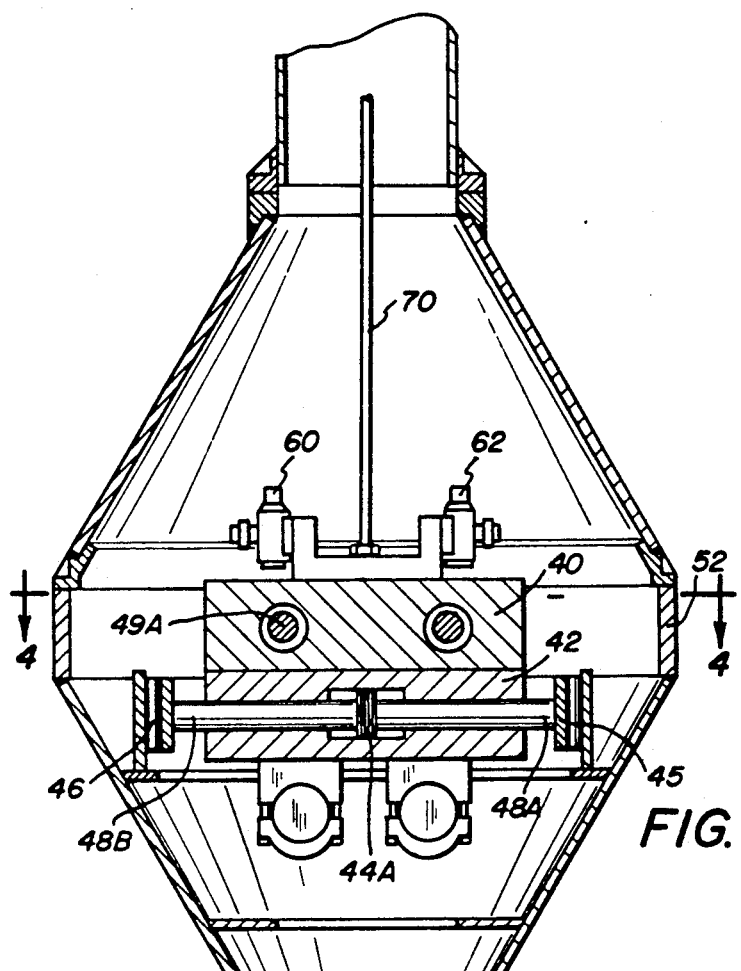
FIG. 3 is a cross sectional view along lines 3—3 of the bottom portion of the vibratory source of FIG. 2.
Figure 4:
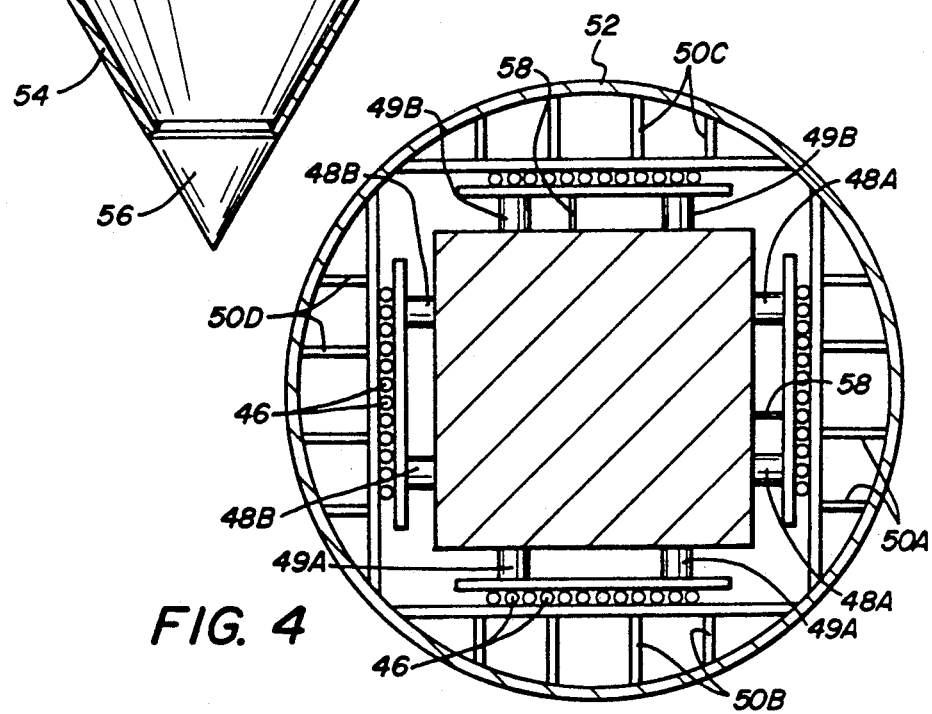
FIG. 4 is a top view of FIG. 3 taken along lines 4—4.

The embodiment of the present invention illustrated in FIGS. 2 through 4 is capable of penetrating about thirty feet of sediment. However, larger versions with much greater penetrating capacity could readily be designed and built following the teachings of the present invention.

The vibratory actuator/reaction mass system of the present invention is illustrated in FIGS. 3 through 8. Referring now to FIG. 3, two sets of reaction masses 40 and 42 are stacked one on top of the other, each having a pair of actuator pistons 43 and 44 respectively, with their respective actuator axes, oriented ninety degrees apart. A hardened steel thrust plate 45, forming an interface with rollers 46, is attached to the outer ends of each pair of actuator rods 48 and 49, which are connected to actuator pistons 44 and 43, respectively. Hardened steel thrust structures 50A, 50B, 50C and 50D, which form mating roller surfaces, are rigidly attached to structural ring 52 and structurally reinforced conic section 54 along with vibratory tip 56. Linearly variable differential transformers (LVDTs) 58 provide position feedback for the two actuator pairs. Vertical hardened steel rollers 46 are located between each of the four thrust plates 44A through 44D and thrust structures 50A through 50D. A roller cage system (not shown) holds rollers 46 in relative positions to one another. Rollers 46 are under a pre-determined preload, such that two-sided contact for each roller 46 is maintained at all times during vibratory action.

Each pair of actuators 43 and 44 is hydraulically in communication with an electro-hydraulic servovalve 60 and 62, which delivers hydraulic fluid to and from actuators 43 and 44 in a controlled, predetermined manner.

Generally, but not exclusively, both pairs of actuators 43 and 44 are commanded by two identical sweep signals, with one of the signal's phase shifted a predetermined amount with respect to the other. Also, the force output amplitudes of the two pairs of actuators 43 and 44 each may vary in a predetermined manner. With these options, the vibrator may be operated in an infinite number of modes. Some of the most common ones are as follows.

In a first mode, circularly polarized shear wave output, wherein the sweep signal phase difference is ninety degrees, and the actuator force output amplitudes are the same. In this mode, horizontal shear and vertical shear waves are generated equally in all directions along with the simultaneous generation of compression waves. The handedness of the polarization may be right, left, or preferably both.

In a second mode, linearly polarized shear wave output, wherein the sweep phase difference is zero or one hundred eighty degrees, and the force output amplitudes are the same.

In a third mode, linearly polarized shear wave output wherein a sweep signal is sent to only one of the two actuator systems in a predetermined selection manner.

In a fourth mode, elliptically polarized shear wave output wherein the sweep phase difference is ninety degrees and the force output amplitude of one actuator pair is some predetermined proportional amount of that of the second actuator pair.

The vibrator concept illustrated in FIGS. 3 and 4 also contains an azimuth sensing device (not shown) which provides azimuthal information to the computer based control system. This information tells the controller the azimuthal orientation of each pair of actuators 43 and 44 and will enable the vibrator displacement to start at any desired azimuth.

Tension rod 70 shown in FIG. 3 provides vertical support for the reaction masses 40 and 42. A tension adjustment (not shown) allows proper vertical positioning of the reaction masses 40 and 42.

Each actuator pair 43 and 44 shown in FIG. 3 can deliver a peak output force of about thirty thousand, assuming a three thousand pounds per square inch operating system. Much larger (and smaller) outputs are feasible.

The purpose of conical tip 56 is to allow continuous intimate contact with the earth during vibration. The resultant downward force is designed to be large enough to move the tip downward as vibratory action enlarges the hole. The tip angle of thirty degrees shown in FIG. 3 is an arbitrary choice, assumed to be reasonable. Alternative angles, either greater or less than thirty degrees may be used. In fact, bulbous shapes for the tip (bottom end of the vibrator) would also work. A spherical tip, for example, may also be used.

Figure 5:
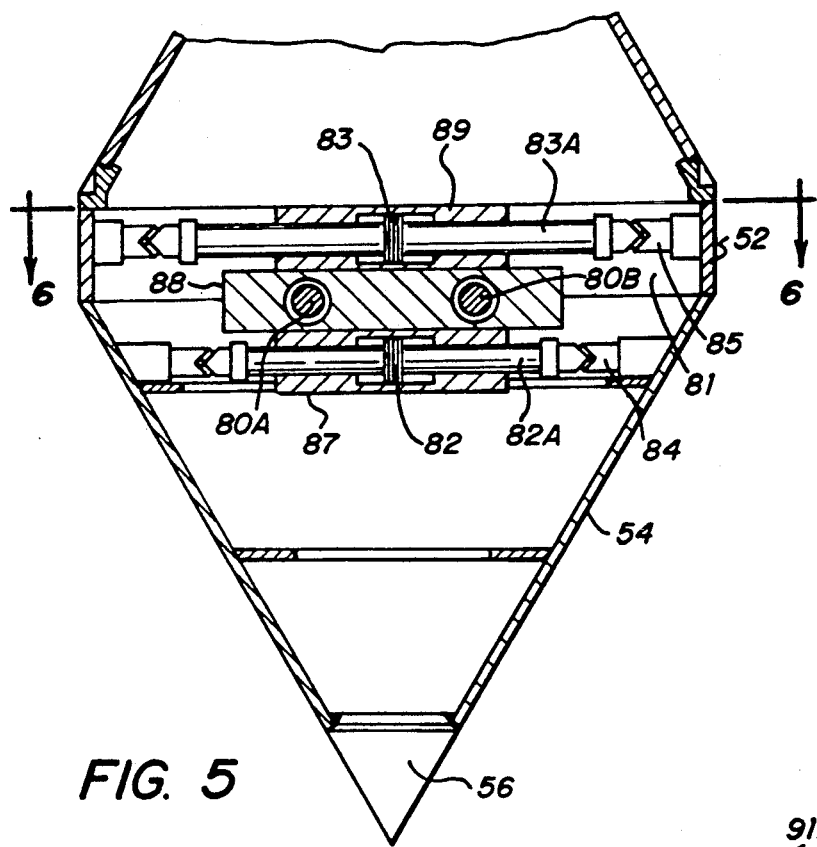
FIG. 5 is an alternate cross sectional view along lines 3—3 of the bottom portion of the vibratory source of FIG. 2.
Figure 6:
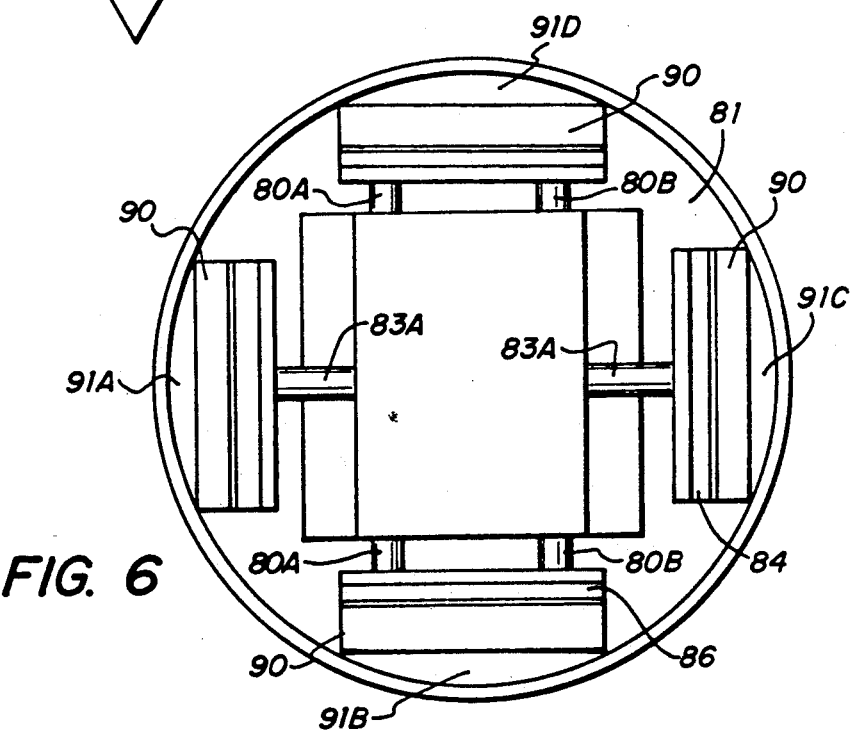
FIG. 6 is a top view of FIG. 5 taken along lines 6—6.

An alternative embodiment of the stacked actuator concept is shown in FIGS. 5 and 6. The purpose is to provide more even actuation in the two orthogonal horizontal directions. One pair of parallel actuators 80 in the same horizontal plane is sandwiched between two single actuators 82 and 83 oriented at right angles with respect to paired actuators 80. Also, needle-bearing rail sets 84, 85 and 86, such as those available from M and M Precision Systems Company, are used instead of vertical rollers 46 shown in FIGS. 3 and 4.

Three sets of reaction masses 87, 88 and 89, with reaction mass being placed in area 81 defined by structural ring 52, are stacked one on top of the other, the center reaction mass 88 having a pair of actuator pistons (not shown) connected to actuator shafts 80A and 80B. The two end reaction masses 87 and 89 each have a single actuator piston 82 and 83 connected to actuator shafts 82A and 83A respectively.

Hardened steel thrust plates 90, form an interface with needle bearings 84, 85 and 86 and are attached to the outer ends of actuator rods 80A, 82A and 83A, which are connected to actuator pistons 80, 82 and 83, respectively. Hardened steel thrust structures 91A, 91B, 91C and 91D are rigidly attached to structural ring 52 and structurally reinforced conic section 54 which is connected to vibratory tip 56. Linearly variable differential transformers (see FIG. 4) provide position feedback for the actuators.

Figure 7:
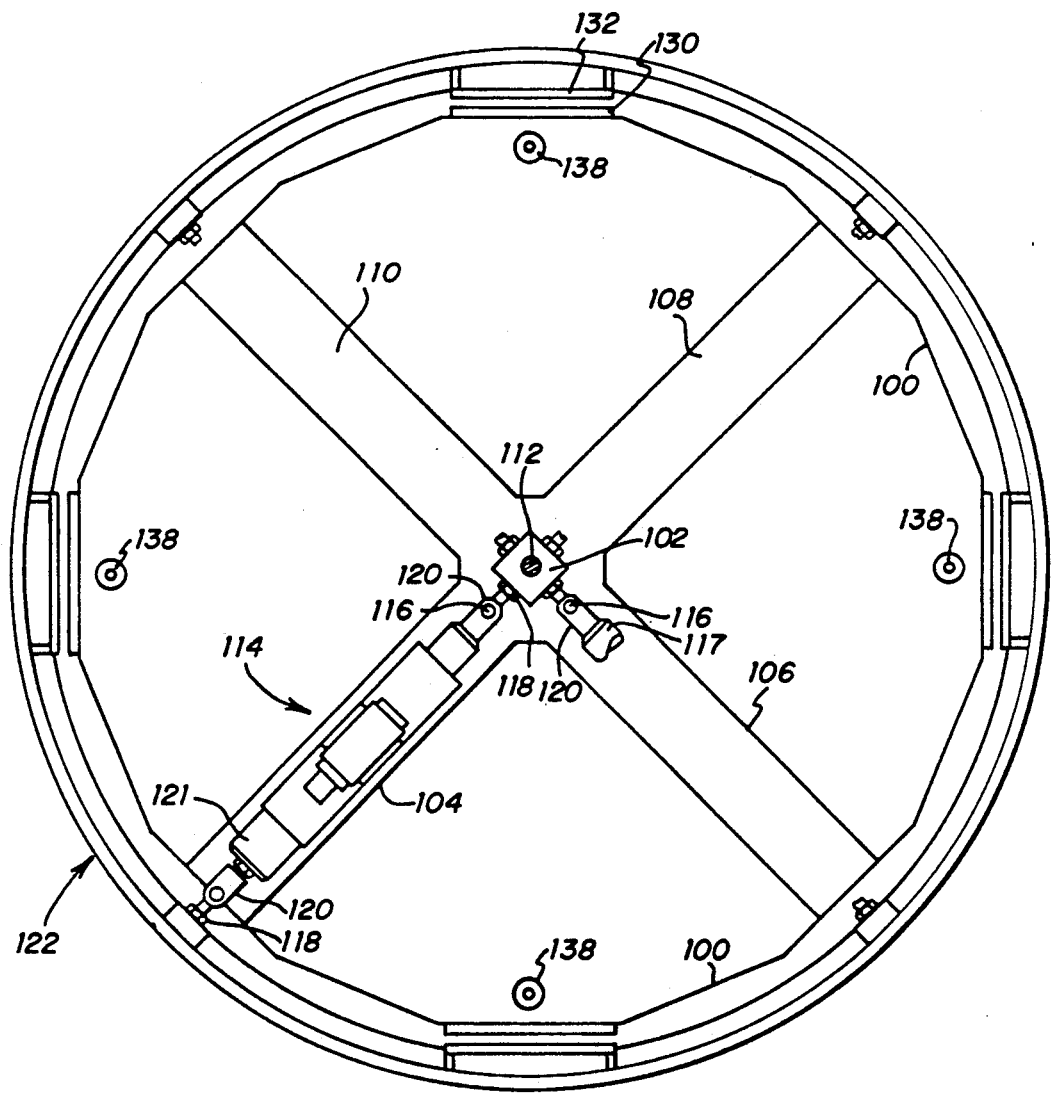
FIG. 7 is an alternate embodiment of the vibratory source of the present invention.

A second alternative embodiment is shown in FIG. 7. This is basically the inverse of the telescoping tube actuation method. A polygonal (or circular) reaction mass 100 with a center post 102 and four radial troughs 104, 106, 108 and 110 is suspended by a tension rod 112 within conic section 54. Four identical actuator assemblies 114 (only one illustrated for simplification), spaced ninety degrees apart, are located within each trough 104, 106, 108 and 110 and are pinned 116 at their inner ends 117 to center post 102 via spherical rod ends 118 and clevises 120. The outer ends 121 are similarly attached to fittings welded to structural ring 122, which is an integral part of the conical structure 54 connected to vibratory tip 56.

Figure 8:
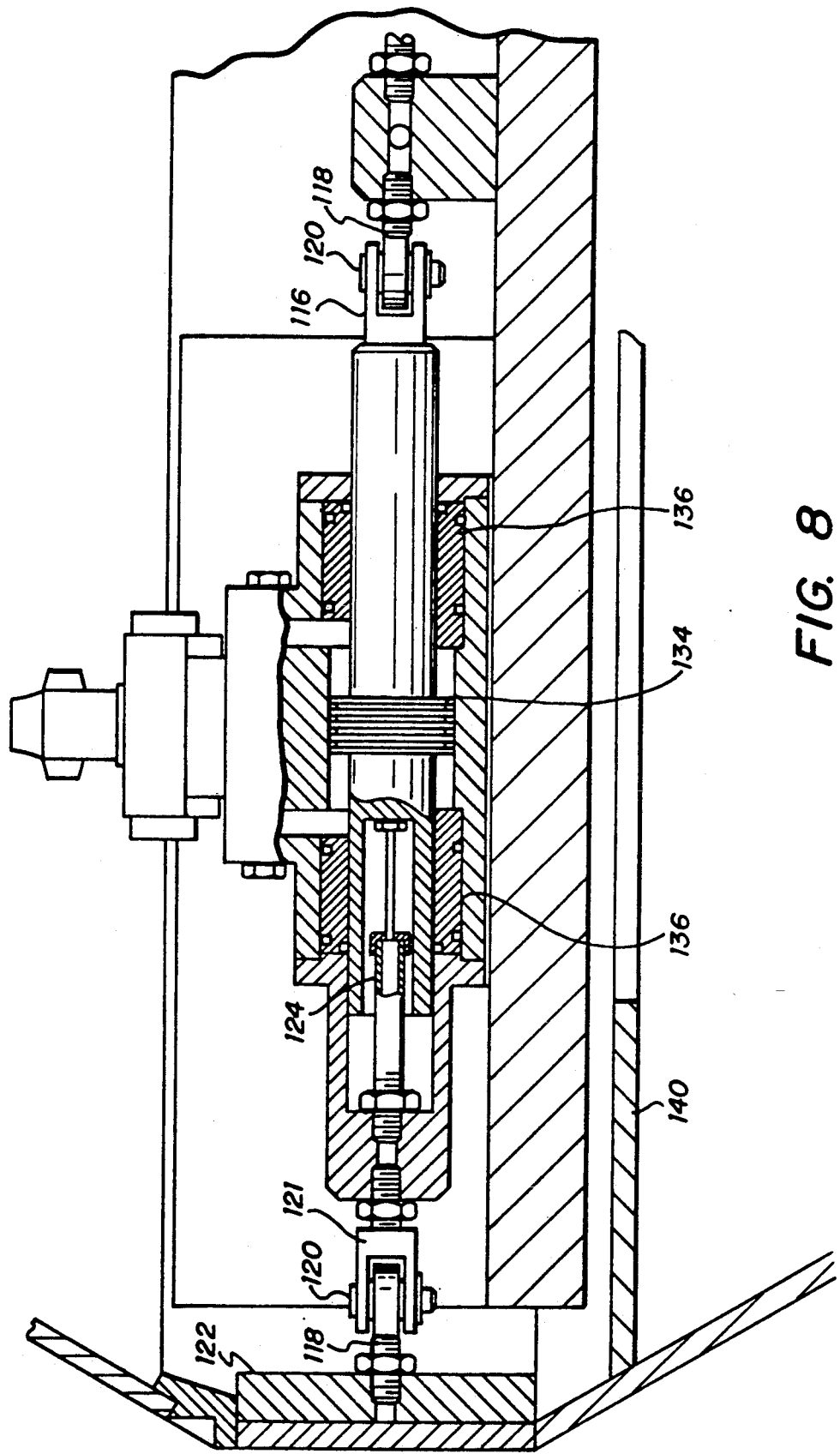
FIG. 8 is a cross sectional view of the vibratory source of FIG. 7.

FIG. 8 shows the actuator in cross section with it built-in LVDT sensor 124 for providing a position feedback signal.

Four elastomer bumpers 130 and matching bumper stops 132 (see FIG. 7), spaced ninety degrees apart, prevent actuator over travel and hence unwanted contact between actuator pistons 134, located within cylinder 135, and bronze sleeves 136. Rotation of reaction mass 100 about its vertical center line is limited by a pin and elastomer cylinder arrangement 138 near each of bumpers 130. The bottom end of the pin is welded to a stiffener ring 140 attached to the conic section 54 connected to vibratory tip 56. The upper end of the pin fits inside an elastomer cylinder which is located in a hole through reaction mass 100. The pin is stepped such that the large diameter part of the pin will contact reaction mass 100 and provide a hard stop after the elastomer cylinder has deflected a certain amount.

Desurgers, (not shown), may be mounted on the top flat sides of reaction mass 100. The center lines of actuator cylinders 135 pass through the vertical center of gravity of reaction mass 100.

The purpose of the passive top reaction mass is to provide a force balance to the vibrator apparatus illustrated in FIGS. 3 through 8. The vibrator apparatus illustrated in FIGS. 3 through 8 would be driven by variable frequency sweeps, just as are surface VIBROSEIS systems. It should be noted that since the displacement of the top reaction mass is small relative to the displacement of the conical tip, a slight rocking action of the tip may occur at low frequencies. This is not believed to be significant. However, any such rocking effects can be totally eliminated by using spherical housing at the bottom in lieu of the conical tip housing.

It should also be noted that although the concepts described above employ electro-hydraulic actuation, these concepts would be just as valid using electromechanical, piezoelectric or magnetostrictive actuation.

As the vibrator penetrates into the sediment, a vacuum may form, producing a higher pressure on the top part of the tip section. During a vibratory sweep, this is desirable. However, it is to be noted that such vacuum would also hamper the subsequent pulling of the vibrator upward out of the sediment. This can easily be overcome by adding a water venting system to the bottom section of the tip. A small water pump inside the tip section would force water through the vent openings to break the vacuum during lifting. The vibrator could also be vibrated at its maximum amplitude frequency during lifting to help prevent sticking in the sediment.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus for providing elliptical polarized shear waves in a marine environment in which a shear wave source penetrates the surface sediment of a water bottom comprising:
   a housing means having a single structural ring section for penetrating surface sediments;

reaction mass means contained within said housing means by said single structural ring section for generating elliptical shear waves which propagate in subsurface formations, said reaction mass means including at least two reaction masses configured to operate at ninety degree displacement with respect to each other;

a vertical member attached at one end to the top of said housing means;

cross shaped structure means fixed to an other end of said vertical member for serving as a passive reaction mass;

motor driven propeller means enclosed in shrouds located at the outer ends of said cross shaped structure for providing dynamic positioning;

piston means located within each said reaction mass means for providing actuation of said reaction mass.

2. The apparatus according to claim 1 wherein said housing means includes an external conic shaped structure having a hardened steel tip.

3. The apparatus according to claim 1 wherein said piston means includes a dual piston and cylinder arrangement with a hydraulic system for pumping hydraulic fluid to move each piston within each cylinder.

4. The apparatus according to claim 3 wherein said piston means includes an electrically driven hydraulic system for pumping hydraulic fluid in said piston means.

5. The apparatus according to claim 3 wherein said piston means includes a connection to an umbilical line to a remote source for pumping hydraulic fluid in said piston means.

6. The apparatus according to claim 5 wherein said housing means includes a single external conic shaped structure having a hardened steel tip.

7. The apparatus according to claim 1 wherein said reaction mass means includes:

first reaction mass driven by a dual piston means;

second and third reaction masses located on the top and bottom of said first reaction mass, said second and third reaction masses driven by a single piston means.

8. The apparatus according to claim 7 wherein said housing means includes a single external conic shaped structure having a hardened steel tip.

9. The apparatus according to claim 7 wherein said piston means includes a dual piston and cylinder arrangement with a hydraulic system for pumping hydraulic fluid to move each piston within each cylinder.

10. The apparatus according to claim 9 wherein said piston means includes an electrically driven hydraulic system for pumping hydraulic fluid in said piston means.

11. The apparatus according to claim 9 wherein said piston means includes a connection to an umbilical line to a remote source for pumping hydraulic fluid in said piston means.

12. The apparatus according to claim 11 wherein said housing means includes a single external conic shaped structure having a hardened steel tip.

13. An apparatus for providing elliptical polarized shear waves in a marine environment in which a shear wave source penetrates the surface sediment of a water bottom comprising:

a housing means having a single structural ring section with a single external conic shaped structure having a hardened steel tip for penetrating surface sediments;

circular reaction mass means contained within said housing means by said single structural ring section for generating shear waves which propagate in subsurface formations, said circular reaction mass means having a center cross shaped member configured as four radii arranged ninety degrees apart from each other, said circular reaction mass means having an electro-hydraulic system for pumping hydraulic fluid;

a vertical member attached at one end to the top of said housing means;

cross shaped structure means fixed to another end of said vertical member for serving as a passive reaction mass;

motor driven propeller means enclosed in shrouds located at the outer ends of said cross shaped structure for providing dynamic positioning;

piston means having a first, a second, a third and a fourth piston, each located on one of said four radii within a first, second, third and fourth cylinder, respectively, said piston means for providing actuation of said circular reaction mass.

14. A method for providing elliptical polarized shear waves in a marine environment in which a shear wave source penetrates the surface sediment of a water bottom comprising the steps of:

penetrating surface sediments using a housing means having a single structural ring section;

generating elliptical shear waves which propagate in subsurface formations using a dual reaction mass means contained within said housing means;

providing a vertical member attached at one end to the top of said housing means with a cross shaped structure means fixed to an other end of said vertical member for serving as a passive reaction mass;

positioning said housing means by actuating motor driven propeller means enclosed in shrouds located at the outer ends of said cross shaped structure;

actuating said dual reaction mass means by a piston means having piston and cylinder arrangements configured at a ninety degree angle with respect to each other located within said dual reaction mass means.

15. The method according to claim 14 wherein said actuation step includes pumping hydraulic fluid to move each said piston within each said cylinder with a hydraulic system.

16. The method according to claim 15 wherein said pumping step includes electrically driving said hydraulic system.

17. The method according to claim 14 wherein said pumping step includes connecting to an umbilical line to a remote source for pumping hydraulic fluid.

* * * * *